2,829,030

PROCESS FOR PRODUCING ALKALI METAL SILICATES

Valentin Habernickel, Dusseldorf, Germany, assignor to Henkel & Cie, G. m. b. H., Dusseldorf-Holthausen, Germany No Drawing. Application April 17, 1956
Serial No. 578,563

Claims priority, application Germany April 23, 1955

6 Claims. (Cl. 23—110)

The present invention relates to a process for producing alkali metal silicates from mixtures of sand and alkali metal chlorides under the action of steam.

It has already been proposed to produce alkali metal silicates or waterglass from said and alkali metal chlorides under the action of steam at high temperatures in order to replace the conventionally used alkali metal carbonates or alkali metal sulfates by the cheaper alkali metal chlorides.

In order to attain reaction velocity required for technical purposes, high reaction temperatures must be used for carrying out the reaction with alkali metal chlorides, the optimum temperature range being 1000 to 1300° C., when common salt is used. However, the sodium chloride melt has a considerable vapor pressure above 950° C. Thus, a mixture of sand and common salt, when processed according to known methods, loses within a short time up to 30% of the original salt contents when treated with a current of steam above 1000° C., whereas up to 60% of the sodium chloride used escapes conversion, due to evaporation at temperatures ranging from 1100 to 1200° C. Moreover, the sodium chloride evaporating from the reaction mixture frequently condenses at the cooler parts of the apparatus, where it slowly collects. Due to the loss in NaCl of the mixture of sand and salt in the hot reaction zone, the molar ratio of $SiO_2/Na_2O$ in the waterglass under formation changes to ratio yielding compounds with a higher $SiO_2$ content, so that finally waterglass will be obtained which is difficultly soluble or insoluble. Such products are not desirable for practical purposes. The high evaporation heat of common salt also leads to the undesirable phenomenon that a considerable portion of the reaction heat is dissipated from the system when sodium chloride evaporates to a marked degree.

It has now been found, quite unexpectedly, that the inconveniences above described can be avoided by subjecting the mixture of alkali metal chloride and sand to a suitable pre-treatment according to the present invention. The pre-treatment consists of subjecting the mixture to a sintering process at temperatures lying slightly above the melting point of alkali metal chloride; the sintered product is then allowed to cool and subsequently comminuted, before a treatment with steam is effected at temperatures ranging from 900–1400° C.

For carrying out the process according to the invention it is advantageous first to grind the mixture of sand and alkali metal chloride and thereafter to sinter the same in a known calcining, granulating, or tempering device; the sintered product is then allowed to cool down, and is disintegrated before the known treatment with steam is performed at higher temperatures. In comminuting the mass, it is not necessary to carry the disintegration down to finest particle size, but it is sufficient and will be preferable for better penetration of steam in the subsequent treatment, when the mass is only broken down to small pieces.

When a mixture of sand and sodium chloride is treated, the sintering is preferably carried out at temperatures from about 810–850° C., whereas the treatment of potassium chloride-sand mixtures is performed advantageously at temperatures from 780–820° C.

The products so obtained from alkali metal chloride and sand have an amazingly low volatility. It is another vantage that $SiO_2$ will be distributed evenly in the molten alkali metal chloride during the sintering process without any separation of the components taking place. By adjustment of the amounts of alkali metal chloride and sand in the starting mixture, the molar ratio of $SiO:Na_2O$ in the end product can be influenced as desired. It has further been found that the yields in soluble alkali metal silicates are particularly high and the losses in alkali metal chloride are remarkably low when the components are used in the molar ratio $SiO_2$:alkali metal chloride-1.5:1, to start with.

The yields in soluble alkali metal silicates are also particularly high and the losses in alkali metal chloride are remarkably low, if to the components is added a little amount (1–10% by weight, preferably 2–5% by weight related to the mixture of alkali metal chloride and sand) of other alkali metal salts. Such alkali metal salts are for example sulfates, carbonates, bicarbonates, preferably $K_2CO_3$, $Na_2CO_3$, $NaHCO_3$ or a mixture of these salts.

It has further been found that the addition of a little amount of other alkali metal salts allowed to finish the treatment with steam of higher temperatures in about the half time as without this addition of the alkali metal salts.

The process according to the invention may be used in discontinuous operation, but more particularly in continuous operations for the production of soluble alkali metal silicates.

The process according to the invention will now be more fully described in a number of examples, but it should be understood that these are given by way of illustration and not of limitation, and that many changes in the details can be made without departing from the spirit of the invention.

METHOD OF OPERATION

Sand or quartz powder is well mixed in a mixing drum with common salt in the molar ratio of 1.5:1 and then ground in an edge mill. Then the mixture is heated in a rotary furnace to temperatures ranging from 810–840° C. until a homogeneous sintered mass is obtained by partial melting of the sodium chloride. The length of this process is depending on the amount of the charge undergoing treatment. With a charge of 400 kg. the time will be about one hour.

The sintered mass is passed on to a disintegrating device, wherein it is broken up after cooling. The products so obtained are treated in a waterglass furnace with a current of steam at temperatures ranging from 1150–1250° C. (see table).

Instead of sodium chloride, potassium chloride may be used. The method of operating is exactly the same as described above; the only difference is that in this case the temperature used will be from 780–810° C. in the pre-treatment.

In the following a number of examples are tabulated which show the application of the above described method of operation as carried out at different temperatures in the treatment with steam. The tables also show the variation of the reaction period, yields of soluble waterglass, degree of conversion of $SiO_2$ and NaCl, and the composition of the final product. In the second horizontal column the results are illustrated when instead of the molar ratio 1.5:1 the ratio of $SiO_2/NaCl=1:1$.

In reading table 1 it should be understood that a pre-treatment, as described in the "Method of operation" above, has preceded the treatment with steam at higher temperatures.

*Table 1a*

| Molar ratio i. starting material $SiO_2/NaCl$ | Reaction temp., °C. | React. period, hrs. | Yield percent soluble watergl. | Ratio $SiO_2/Na_2O$ i. soluble watergl. | Percent convert. $SiO_2$ as soluble watergl. | Percent convert. NaCl as soluble watergl. |
|---|---|---|---|---|---|---|
| 1.5:1 | 1,150 | 2 | 86.1 | 3.16 | 85.3 | 82.0 |
|  | 1,200 | 2 | 89.5 | 3.10 | 89.5 | 87.0 |
|  | 1,250 | 6 | 85.5 | 3.11 | 83.5 | 80.5 |
| 1:1 | 1,150 | 2 | 90.8 | 2.80 | 98.8 | 69.2 |
|  | 1,200 | 3 | 90.1 | 2.88 | 99.5 | 67.0 |
|  | 1,210 | 5 | 87.4 | 2.90 | 97.0 | 65.0 |
|  | 1,250 | 2 | 90.0 | 2.96 | 99.0 | 67.0 |

The following Table 1b shows the results obtained with the same method of operation, however in addition of a little amount of other alkali metal salts. In these examples is used as alkali metal salt $Na_2CO_3$. At the producing of soluble potassium silicates it may be practical to use $K_2CO_3$ instead of $Na_2CO_3$.

*Table 1b*

| Molar ratio i. starting material $SiO_2/NaCl$ | Add. in percent by weight | React. temp., °C. | React. period, hrs. | Yield percent soluble watergl. | Ratio $SiO_2/Na_2O$ i. soluble watergl. | Percent convert. $SiO_2$ as soluble watergl. | Percent convert. NaCl as soluble watergl. |
|---|---|---|---|---|---|---|---|
| 1.5:1 | 4 | 1,200 | 1 | 89 | 2.74 | 93 | 92.2 |
| 1.5:1 | 3 | 1,250–1,300 | 1 | 92 | 3.10 | 92.2 | 96 |
| 1:1 | 4 | 1,250 | 1 | 92 | 2.40 | 92 | 81.2 |

As addition it is used always anhydrous sodium carbonate. The declaration percent by weight is related of the total mixture of alkali metal chloride and sand.

The following Table 2 shows, for comparison, the results obtained with the same method of operation, however, without the pre-treatment of the starting components according to the invention.

*Table 2*

| Molar ratio i. starting material $SiO_2/NaCl$ | Reaction temp., °C. | React. period, hrs. | Yield percent soluble watergl. | Ratio $SiO_2/Na_2O$ i. soluble watergl. | Percent convert. $SiO_2$ as soluble watergl. | Percent convert. NaCl as soluble watergl. |
|---|---|---|---|---|---|---|
| 1:1 | 1,050 | 2 | | | | |
|  | 1,140 | 2 | | | | |
|  | 1,250 | 4 | traces | | | |
|  | 1,300 | 5 | traces | | | |
| 1:2 | 1,050 | 3 | 0.56 | 2.05 | 1.11 | 0.54 |
|  | 1,200 | 5 | 1.13 | 3.20 | 2.54 | 0.76 |
|  | 1,300 | 5 | 3.40 | 3.60 | 7.86 | 2.10 |
| 1:3 | 1,200 | 5 | 1.05 | 2.85 | 3.06 | 0.69 |
|  | 1,250 | 5 | 2.02 | 3.80 | 6.26 | 1.06 |
|  | 1,350 | 3 | 6.40 | 4.10 | 20.00 | 3.17 |

When the molar ratio $SiO_2/NaCl$ is changed to 1.5:1, practically the same results are obtained as in the first horizontal column where the molar ratio is 1:1. Only when the amount of alkali metal chloride is increased, as shown in columns 2 and 3 respectively, somewhat better results are obtained.

A comparison between Tables 1 and 2 clearly illustrates that the pre-treatment according to the invention permits to obtain a considerable improvement in the soluble alkali metal silicates so produced.

What I claim is:

1. A process for producing soluble alkali metal silicates from mixtures of sand and alkali metal chlorides at high temperatures comprising the steps of mixing sand and an alkali metal chloride, heating said mixture to a temperature slightly above the melting temperature of the alkali metal chloride to about 780–850° C., sintering the mixture, cooling the same, and then disintegrating the cooled, sintered mass before subjecting the same to a treatment with steam at temperatures ranging from 900–1400° C.

2. The process according to claim 1 which comprises subjecting a mixture of sand and sodium chloride in a molar ratio of about 1.5:1 to a sintering treatment at a temperature ranging from 810–850° C. until a homogeneous sintered mass is obtained, cooling said mass, disintegrating the cooled mass and thereafter treating the same at temperatures ranging from 1150–1250° C. with a current of steam.

3. The process according to claim 1 which comprises subjecting a mixture of sand and potassium chloride in a molar ratio of about 1.5:1 to a sintering treatment at a temperature ranging from 780–820° C. until a homogeneous sintered mass is obtained, cooling said mass, disintegrating the cooled mass and thereafter treating the same at temperatures ranging from 1150–1250° C. with a current of steam.

4. A process for producing soluble alkali metal silicates from mixtures of sand and alkali metal chlorides at high temperatures, comprising the steps of mixing sand and an alkali metal chloride in addition of a little amount of other alkali metal salts, heating said mixture to a temperature slightly above the melting temperature of the alkali metal chloride to about 780–850° C., sintering the mixture, cooling the same, and then disintegrating the cooled, sintered mass before subjecting the same to a treatment with steam at temperatures ranging from 900–1400° C.

5. A process according to claim 4, which comprises subjecting a mixture of sand, alkali metal chloride and a little amount of sodium carbonate to a sintering treatment at a temperature ranging from 780°–850° C. until a homogeneous sintered mass is obtained, cooling said mass, disintegrating the cooled mass and thereafter treating the same at temperatures ranging from 900–1400° C. with a current of steam.

6. A process according to claim 4, which comprises subjecting a mixture of sand and potassium chloride in addition of a little amount of potassium carbonate to a sintering treatment at a temperature ranging from 780–820° C. until a homogeneous sintered mass is obtained, cooling said mass, disintegrating the cooled mass and thereafter treating the same at temperatures ranging from 900–1400° C. with a current of steam.

References Cited in the file of this patent
UNITED STATES PATENTS

| | | |
|---|---|---|
| 376,410 | Kayser | Jan. 10, 1888 |

FOREIGN PATENTS

| | | |
|---|---|---|
| 395,182 | Great Britain | July 13, 1933 |
| 462,632 | Great Britain | Mar. 12, 1937 |